(12) United States Patent
Goern

(10) Patent No.: US 11,531,536 B2
(45) Date of Patent: Dec. 20, 2022

(54) ANALYZING PERFORMANCE IMPACTS OF SOURCE CODE CHANGES

(71) Applicant: Red Hat, Inc., Raleigh, NC (US)

(72) Inventor: Christoph Goern, Grasbrunn (DE)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 16/689,509

(22) Filed: Nov. 20, 2019

(65) Prior Publication Data

US 2021/0149666 A1    May 20, 2021

(51) Int. Cl.
| | | |
|---|---|---|
| G06F 9/44 | (2018.01) | |
| G06F 8/71 | (2018.01) | |
| G06N 5/04 | (2006.01) | |
| G06N 20/00 | (2019.01) | |
| G06F 8/77 | (2018.01) | |

(52) U.S. Cl.
CPC ............... *G06F 8/71* (2013.01); *G06F 8/77* (2013.01); *G06N 5/04* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 8,578,348 B2 | 11/2013 | Fliess et al. | |
| 8,694,983 B1 * | 4/2014 | Sobel | G06F 8/60 717/168 |
| 9,733,985 B2 | 8/2017 | Iyoob et al. | |
| 10,057,139 B2 | 8/2018 | Dong et al. | |
| 10,171,371 B2 | 1/2019 | Anwar et al. | |
| 10,503,632 B1 * | 12/2019 | Sivanantham | G06F 11/3608 |
| 10,635,566 B1 * | 4/2020 | Talluri | G06F 11/3404 |
| 10,754,706 B1 * | 8/2020 | Mo | G06F 9/4887 |
| 2005/0235012 A1 * | 10/2005 | Harry | G06F 8/71 |
| 2006/0203812 A1 * | 9/2006 | Demuth | G06F 8/65 370/360 |
| 2009/0070734 A1 * | 3/2009 | Dixon | G06F 8/71 717/102 |
| 2013/0311968 A1 * | 11/2013 | Sharma | G06F 11/3692 717/101 |

(Continued)

OTHER PUBLICATIONS

Coplin et al., "Effects of Source Code Optimizations on GPU Performance and Energy Consumption," Copyright 2015 ACM (Year: 2015).*

(Continued)

*Primary Examiner* — Insun Kang
(74) *Attorney, Agent, or Firm* — Womble Bond Dickinson (US) LLP

(57) ABSTRACT

A method for analyzing performance impacts of changes to source code includes logging a change to source code and an identifier (ID) of an author of the change into a database. The method further includes providing the change to the source code to a machine learning model trained to analyze performance impacts of source-code changes. The method further includes generating, by a processing device, in view of the machine learning model, a performance impact of the change to the source code. The method further includes determining that the performance impact is above a performance-impact threshold. The method further includes, in view of the determining, preventing the change to the source code from being executed by the processing device.

17 Claims, 5 Drawing Sheets

(56) References Cited

U.S. PATENT DOCUMENTS

| | | | |
|---|---|---|---|
| 2016/0210553 A1* | 7/2016 | Bolton | G06Q 10/06 |
| 2016/0314064 A1* | 10/2016 | Moretto | H04L 41/5035 |
| 2016/0381166 A1* | 12/2016 | Holland | G06F 11/3495 |
| | | | 709/217 |
| 2017/0097812 A1* | 4/2017 | Bennett | G06F 8/33 |
| 2017/0212891 A1* | 7/2017 | Pundir | G06F 3/067 |
| 2017/0262361 A1* | 9/2017 | Francis | G06F 11/3672 |
| 2018/0025289 A1* | 1/2018 | Doshi | G06F 9/50 |
| | | | 706/12 |
| 2018/0074936 A1* | 3/2018 | Broadbent | G06F 11/36 |
| 2018/0089592 A1* | 3/2018 | Zeiler | G06F 16/212 |
| 2018/0107583 A1* | 4/2018 | Champlin-Scharff | G06F 11/368 |
| 2018/0157971 A1* | 6/2018 | Fusi | G06N 7/005 |
| 2018/0239689 A1* | 8/2018 | White, Jr. | G06F 21/53 |
| 2018/0307480 A1* | 10/2018 | Doyle | G06F 8/658 |
| 2018/0314519 A1* | 11/2018 | Lee | G06F 9/44526 |
| 2019/0026108 A1* | 1/2019 | Byrd | G06F 11/3612 |
| 2019/0079850 A1* | 3/2019 | Zhang | G06F 8/71 |
| 2019/0163616 A1* | 5/2019 | Govindaraju | G06F 11/3672 |
| 2019/0220253 A1* | 7/2019 | Pradhan | G06N 3/08 |
| 2019/0227912 A1* | 7/2019 | Banuelos | G06F 11/3664 |
| 2019/0243617 A1* | 8/2019 | Stevens | G06F 8/35 |
| 2019/0251492 A1* | 8/2019 | Bender | G06N 5/025 |
| 2019/0266070 A1* | 8/2019 | Bhandarkar | G06F 11/3644 |
| 2019/0272171 A1* | 9/2019 | Chen | G06F 8/77 |
| 2019/0295038 A1* | 9/2019 | Kozloski | G06F 8/71 |
| 2019/0324886 A1* | 10/2019 | Champlin-Scharff | G06F 11/3684 |
| 2019/0361686 A1* | 11/2019 | Gnazdowsky | G06F 8/71 |
| 2019/0391904 A1* | 12/2019 | Sabharwal | G06F 8/65 |
| 2020/0019393 A1* | 1/2020 | Vichare | G06F 8/60 |
| 2020/0034135 A1* | 1/2020 | Shi | G06N 5/04 |
| 2020/0151259 A1* | 5/2020 | Smith | G06N 3/084 |
| 2020/0241849 A1* | 7/2020 | Marthala | G06F 8/51 |
| 2020/0249941 A1* | 8/2020 | Tornhill | G06F 8/77 |
| 2020/0257504 A1* | 8/2020 | Kadam | G06F 8/65 |
| 2020/0310790 A1* | 10/2020 | Fox | G06F 8/75 |
| 2020/0341755 A1* | 10/2020 | Woulfe | G06N 20/00 |
| 2020/0371778 A1* | 11/2020 | Ni | G06F 8/71 |
| 2020/0380033 A1* | 12/2020 | Vyas | G06F 9/54 |
| 2020/0394310 A1* | 12/2020 | Sloane | G06N 3/04 |
| 2020/0409754 A1* | 12/2020 | Li | G06F 9/466 |
| 2021/0011712 A1* | 1/2021 | Grant | G06F 11/3616 |

OTHER PUBLICATIONS

Jiang et al., "Do Programmers do Change Impact Analysis?," Jun. 15, 2014 , www3.nd.edu (Year: 2014).*

"A Learning Algorithm for Change Impact Prediction," Musco et al., ACM, 2016 (Year: 2016).*

Alieu Jallow, Cloud-Metric: A Cost Effective Application Development Framework for Cloud Infrastructures, Department of Information Technology, Division of Science Computing, Uppsala University, Sweden, Jun. 2016, 1-63.

Alieu Jalow; et al. , Cost-aware Application Development and Management using-CLOUD-METRIC, Department of Information Technology, Division of Scientific Computing, Uppsala University, Sweden, 2017, 1-8.

Brian Wren, Azure Monitor Data Platform, Microsft, Mar. 26, 2019, 1-5.

Keji Xu, Monitoring GPU Utilization with Amazon CloudWatch, Amazon CloudWatch, Apache MXNet on AWS, Nov. 3, 2017, 1-5.

* cited by examiner

ANALYZING PERFORMANCE IMPACTS OF SOURCE CODE CHANGES

TECHNICAL FIELD

Aspects of the present disclosure relate to analyzing performance impacts of source code changes and, more specifically, relate to analyzing performance impacts of source code changes using a machine learning model.

BACKGROUND

Source code is a fundamental component of a computer program that is created by a programmer. It can be read and easily understood by a human being. When a programmer types a sequence of programming language statements into a notepad, for example, and saves the sequence as a text file, the text file is said to contain the source code.

A source-code repository is a file archive and web hosting facility for source code of software, documentation, web pages, and other works, accessible either publicly or privately. They are often used by open-source software projects and other multi-developer projects to maintain revision and version history, or version control.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
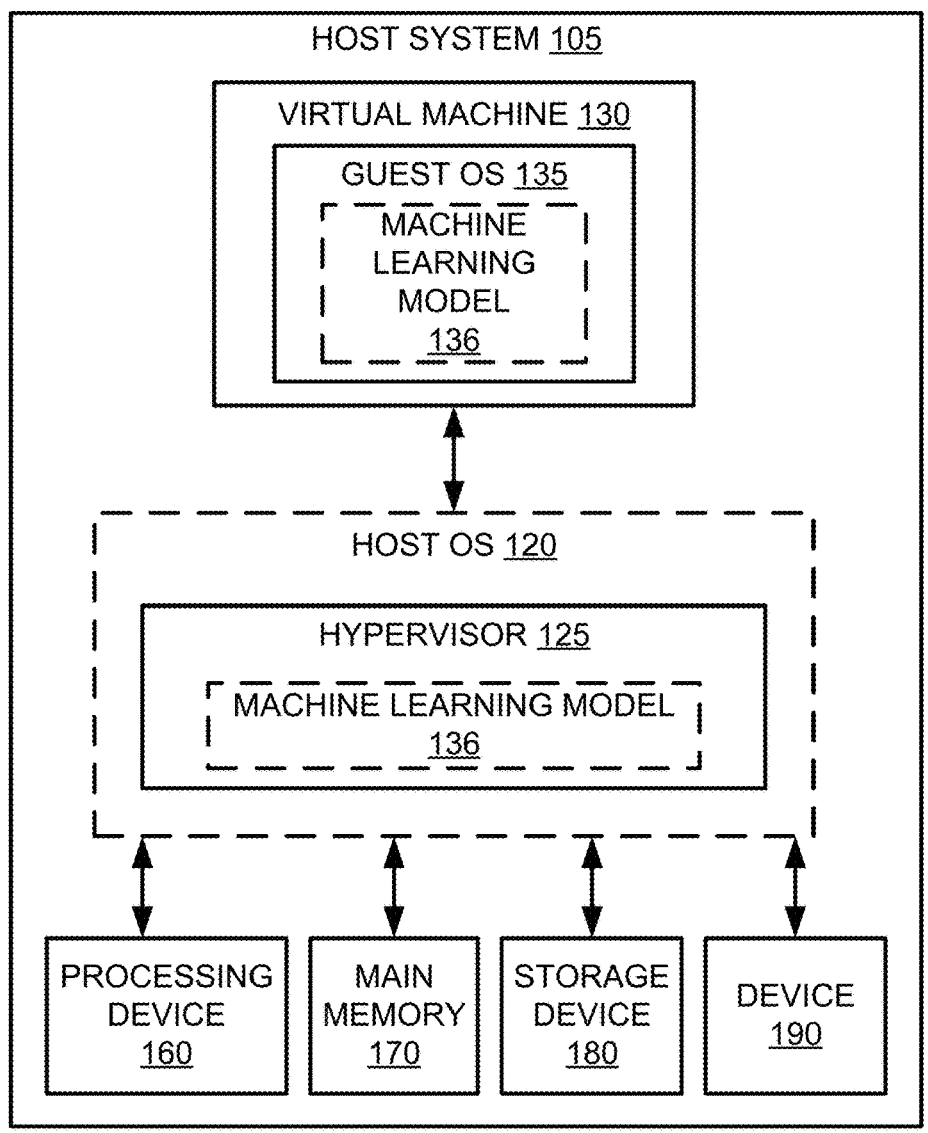
FIG. 1 depicts a first high-level component diagram of an illustrative example of a computer system architecture, in accordance with one or more aspects of the present disclosure.

Aspects of the present disclosure relates to analyzing performance impacts of source code using a machine learning model. In some embodiments, cost management of cloud-based infrastructure makes use of tracking metrics, such as CPU consumption or network bandwidth utilized to determine the performance impact of source code. Such embodiments may be cumbersome to execute and inaccurate and inefficient in use. Advantageously, alternative embodiments are described herein that overcome the above deficiencies. The embodiments described herein utilize developer activity (e.g., source code changes), application metrics (e.g., via tracing, bottle neck analysis, etc.), and platform metrics (e.g., CPU consumption by subsystem) to provide new insights into the causalities of high-resource consumption on cloud-based infrastructure. Specifically, the above inputs, and others, may be used by a machine learning model to accurately and efficiently determine high-impact changes (e.g., changes having a negative performance/impact below a defined threshold) to source code, flag developers responsible for authoring the source code, and make changes to the cloud-based infrastructure.

In one embodiment, the machine learning models described herein may include correlation engines that, generate reports identifying performance impact based on a sliding window, during which time source code changes and other metrics are tracked and analyzed.

A variety of data points, include those described above and others, may be input into one or more machine learning models to generate one or more outputs. In a variety of embodiments, the data points may originate from any number of sources, including the cloud-based infrastructure itself, and other, third-party platforms. System, platform, and application metrics and traces, and also other developer activities and events, maybe periodically and/or dynamically (e.g., via push and/or pull mechanisms) aggregated into a data stream and provided as input into a machine learning model.

The machine learning models may generate reports in a variety of formats, (e.g., text documents), create action items to be completed by human or machine, and/or automatically (e.g., without human interaction) modify configurations and other characteristics of cloud-based infrastructures in view of the machine learning output. In one embodiment, a machine learning based correlation engine creates reports and takes action for a given time window. The report may include an operational cost (e.g., performance impact of source code) of the given time window.

For example, metrics are recorded during a sliding window for CPU utilization and memory consumption for a particular subunit of a cloud-based platform. At the same time, traces indicate that an application running on the subunit is experiencing higher execution time for a given function. Events also indicate that a developer made changes to source code that went into production in that subunit during this time. In this example, a machine learning model may generate a report indicating that the changes made by the developer may be detrimental to the subunit and/or cloud-based platform. Furthermore, the result of such analysis may cause the cloud-based platform to quarantine the new source code, such that it is prevented from further executing on the system. The developer and/or other code belonging to the developer may be flagged in the system, indicating that further review should be performed. In some embodiments, the system may prevent the particular developer from executing additional code on the system until the review has occurred. Furthermore, karma, or some other metrics that tracks the proficiency of the developer, may be decreased.

In particular embodiments, a method for analyzing performance impacts of changes to source code includes logging a change to source code and an identifier (ID) of an author of the change into a database. The method further includes providing the change to the source code to a machine learning model trained to analyze performance impacts of source-code changes. The method further includes generating, by a processing device, in view of the machine learning model, a performance impact of the change to the source code. The method further includes determining that the performance impact is above a performance-impact threshold. The method further includes, in view of the determining, preventing the change to the source code from being executed by the processing device.

FIG. 1 depicts a first high-level component diagram of an illustrative example of a computer system architecture 100, in accordance with one or more aspects of the present disclosure. One skilled in the art will appreciate that other computer system architectures 100 are possible, and that the implementation of a computer system utilizing examples of the invention are not necessarily limited to the specific architecture depicted by FIG. 1. Worth noting, although FIG. 1 illustrates a cloud-based infrastructure virtual-machine system to perform the operations described herein, other non-cloud-based systems are contemplated.

In one embodiment, a virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system (OS) of the host machine is typically referred to as the "host operating system." Typically, software on the host machine known as a "hypervisor" (or a "virtual machine monitor") manages the execution of one or more virtual machines or "guests", providing a variety of functions such as virtualizing and allocating resources, context switching among virtual machines, etc.

As shown in FIG. 1, computer system architecture 100 includes a host system 105. The host system 105 includes one or more processing devices 160 (e.g., central processing units, graphical processing units, etc.), main memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, net, which based serve as data storage for a source code repository) work interface controller (NIC), a video card, an I/O device, etc.). In certain implementations, main memory 170 may be non-uniform access (NUMA), such that memory access time depends on the memory location relative to processing device 160. It should be noted that although, for simplicity, a single processing device 160, main memory 170, storage device 180, and device 190 are depicted in FIG. 1, other embodiments of host system 105 may include a plurality of CPUs, GPUs, memories, storage devices, and devices.

The host system 105 may be a server, a mainframe, a workstation, a personal computer (PC), a mobile phone, a palm-sized computing device, etc. Host system 105 may additionally include one or more virtual machine (VM), e.g., high-performance VM 130, and host operating system (OS) 120. It should be noted that like every other component of system 100, host OS 120 is optional (e.g., for hardware-based hypervisors). VM 130 is a software implementation of a machine that executes programs as though it was an actual physical machine. Host OS 120 and/or hypervisor 125 manages the hardware resources of the computer system and provides functions such as inter-process communication, scheduling, memory management, and so forth.

VM 130 may include a guest operating system (OS) 135 that handles the execution of applications (e.g., workloads) within the virtual machine. Guest OS 135 may control a device 190 through a device driver. It should be noted that although, for simplicity, a single VM 130 is depicted in FIG. 1, host system 105 may host multiple VMs 130.

Host OS 120 may include a hypervisor 125, which provides a virtual operating platform for VMs 130 and manages their execution. It should be noted that in some alternative implementations, hypervisor 125 may be external to host OS 120, rather than embedded within host OS 120, or may replace host OS 120.

In one embodiment, guest OS 135 and/or hypervisor 125 may include machine-learning model 136. In another embodiment, machine learning model 136 may be included elsewhere in the system (e.g., on processing device 160 and/or device 190). As will be described in detail, machine learning model 136 may be responsible for performing the performance impact analysis tasks described herein.

Figure 2:
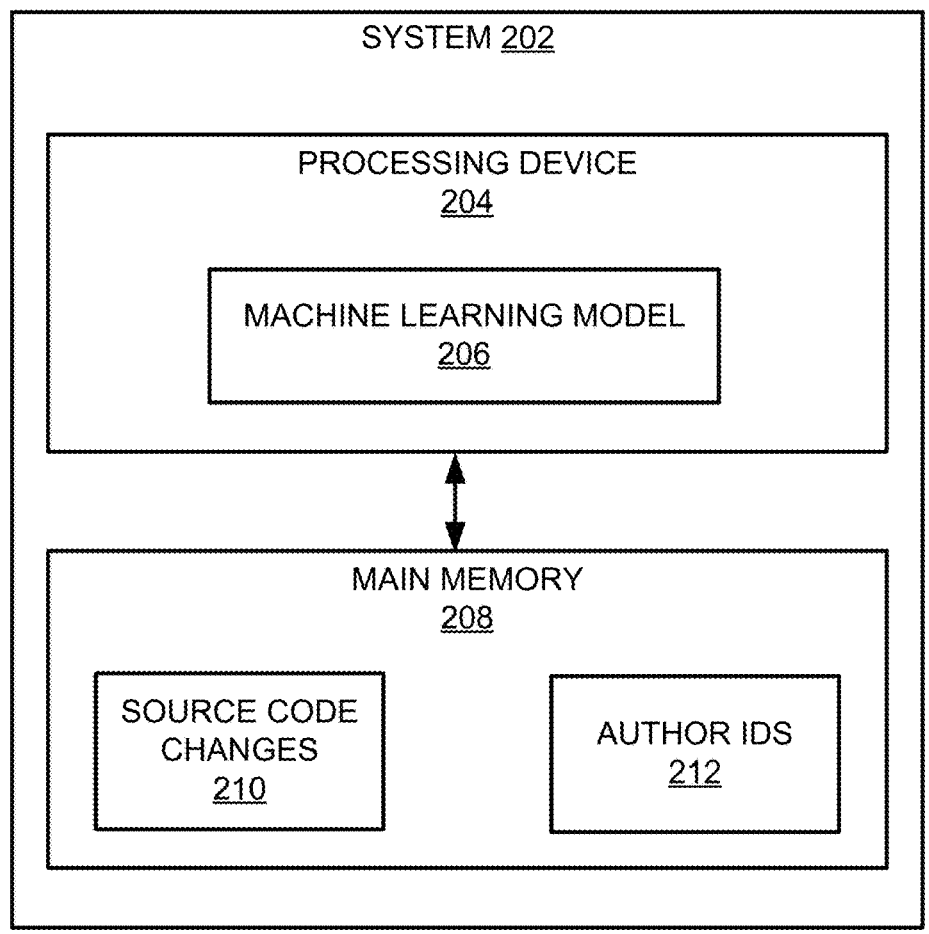
FIG. 2 depicts a second high-level component diagram of an illustrative example of a computer system architecture, in accordance with one or more aspects of the present disclosure.

FIG. 2 depicts a second high-level component diagram of an illustrative example of a computer system architecture 200, in accordance with one or more aspects of the present disclosure. One skilled in the art will appreciate that other computer system architectures 200 are possible, and that the implementation of a computer system utilizing examples of the invention are not necessarily limited to the specific architecture depicted by FIG. 2.

In one embodiment, computer system architecture 200 represents a subset of the VM computer system architecture 100 of FIG. 1. In another embodiment, computer system architecture 200 illustrates a portion of a non-VM computer system architecture. The system 202 may be a server, a mainframe, a workstation, a personal computer (PC), a mobile phone, a palm-sized computing device, etc. As described herein, system 202 may additionally include one or more VMs.

As shown in FIG. 2, computer system architecture 200 includes a system 202. The system 202 includes one or more central processing units (e.g., processing device 204) and main memory 208, which may include volatile memory devices (e.g., random access memory (RAM)), non-volatile memory devices (e.g., flash memory) and/or other types of memory devices. In certain implementations, main memory 270 may be non-uniform access (NUMA), such that memory access time depends on the memory location relative to processing device 204. In one embodiment, main memory 208 stores source code changes 210 and/or author IDs 212, to be input into machine learning model 206. In various embodiments, source code changes 210, stored in a repository, correspond to a unique author ID, to identify the developer who authored the code. Advantageously, this allows machine learning model 206 to identify developers who may be underperforming, and take a variety of actions as a result.

It should be noted that although, for simplicity, a single processing device 204 and main memory 270 are depicted in FIG. 2, other embodiments of system 202 may include a plurality of CPUs, GPUs, memories, storage devices, and devices. In one embodiment, processing device 204 may include machine learning model 206. In other embodiments, machine learning model 206 may be included in other components of system 202, or external to system 202.

Figure 3:
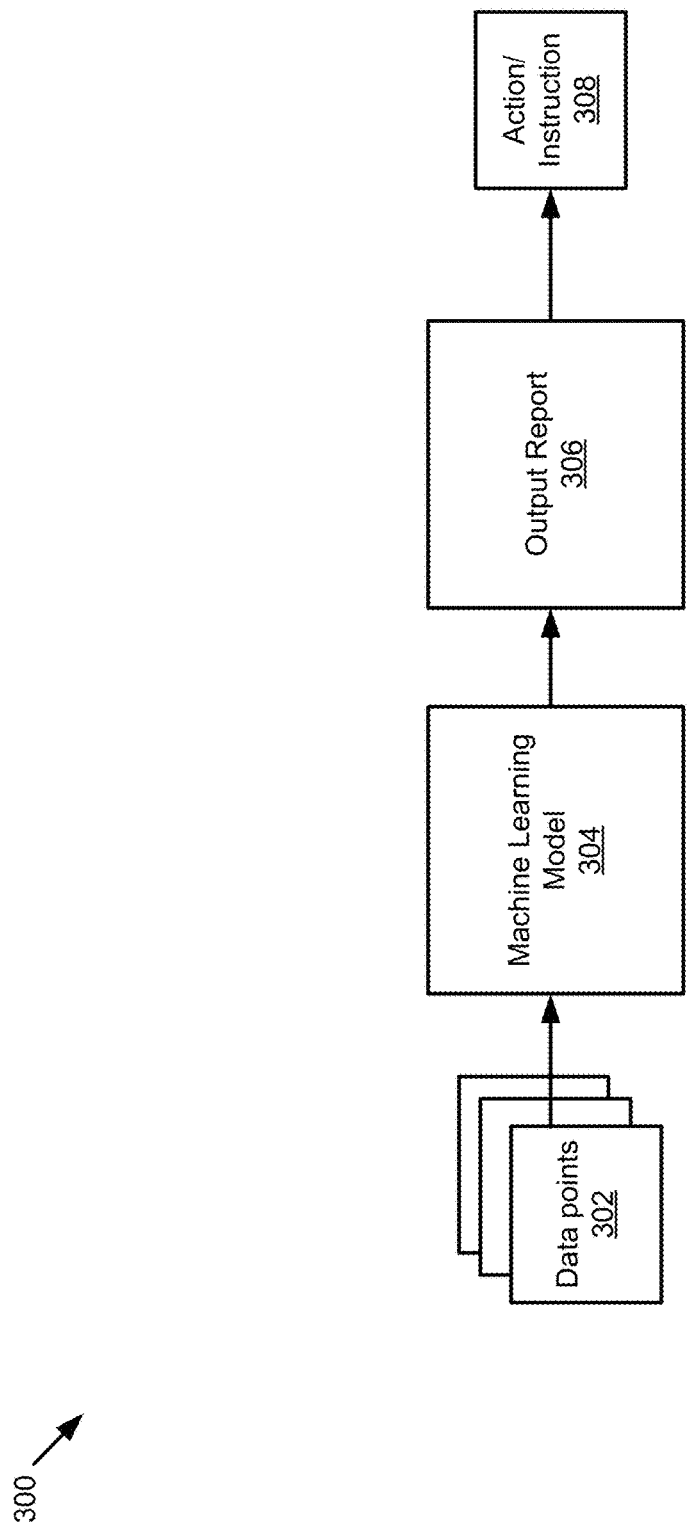
FIG. 3 is a block diagram of a sequence of source-code analysis using a machine learning model, according to an example of the present disclosure.

FIG. 3 is a block diagram of a sequence 300 of source-code analysis using a machine learning model, according to an example of the present disclosure. As described herein, the operations described with respect to FIG. 3 utilize developer activity (e.g., source code changes), application metrics (e.g., via tracing, bottle neck analysis, etc.), and platform metrics (e.g., CPU consumption by subsystem) to provide new insights into the causalities of high-resource consumption on cloud-based infrastructure. Such data points 302 are aggregated into a data stream and provided as inputs to a machine learning model 304 to accurately and efficiently determine high-impact changes (e.g., changes having a negative performance/impact below a defined threshold) to source code, generate reports 306, flag developers responsible for authoring the source code, and make changes to the cloud-based infrastructure 308.

In one embodiment, the machine learning model 304 described herein may include correlation engines that, generate reports 306 identifying performance impact based on a sliding window, during which time source code changes and other metrics are tracked and analyzed. In other embodiments other timing techniques may be utilized.

Advantageously, a variety of data points 302, include those described above and others, may be input into one or more machine learning models (e.g., 304) to generate one or more outputs (e.g., reports 306 and/or actions/instructions 308). In a variety of embodiments, the data points 302 may originate from any number of sources, including the cloud-based infrastructure itself, and other, third-party platforms. System, platform, and application metrics and traces, and also other developer activities and events, maybe periodically and/or dynamically (e.g., via push and/or pull mechanisms) aggregated into a data stream and provided as input into a machine learning model 304.

In one embodiment, the machine learning model 304 may generate reports 306 in a variety of formats, (e.g., text documents), create action items/computer readable instructions 308 to be completed by human or machine, and/or automatically (e.g., without human interaction) modify configurations and other characteristics of cloud-based infrastructures in view of the machine learning output. In one embodiment, a machine learning based correlation engine creates reports 306 and takes action for a given sliding time window. The report may include an operational cost (e.g., performance impact of source code) of the given time window, associated source code, and or author IDs.

In one example, metrics are recorded during a sliding window for CPU utilization and memory consumption for a particular subunit of a cloud-based platform. At the same time, traces (e.g., from a third-party source) indicate that an application running on the subunit is experiencing higher execution time for a given function. Events also indicate that a developer made changes to source code that went into production in that subunit during this time. These data points 302 are aggregated into a data stream and input into machine learning model 304. In this example, a machine learning model (e.g., 304) may generate a report 306 indicating that the changes made by the developer may be detrimental to the subunit and/or cloud-based platform. Furthermore, the result of such analysis may cause the cloud-based platform to quarantine the new source code 308, such that it is prevented from further executing on the system. The developer and/or other code belonging to the developer may be flagged in the system, indicating that further review should be performed. In some embodiments, the system may prevent the particular developer from executing additional code on the system until the review has occurred. Furthermore, karma, or some other metrics that tracks the proficiency of the developer, may be decreased.

Figure 4:
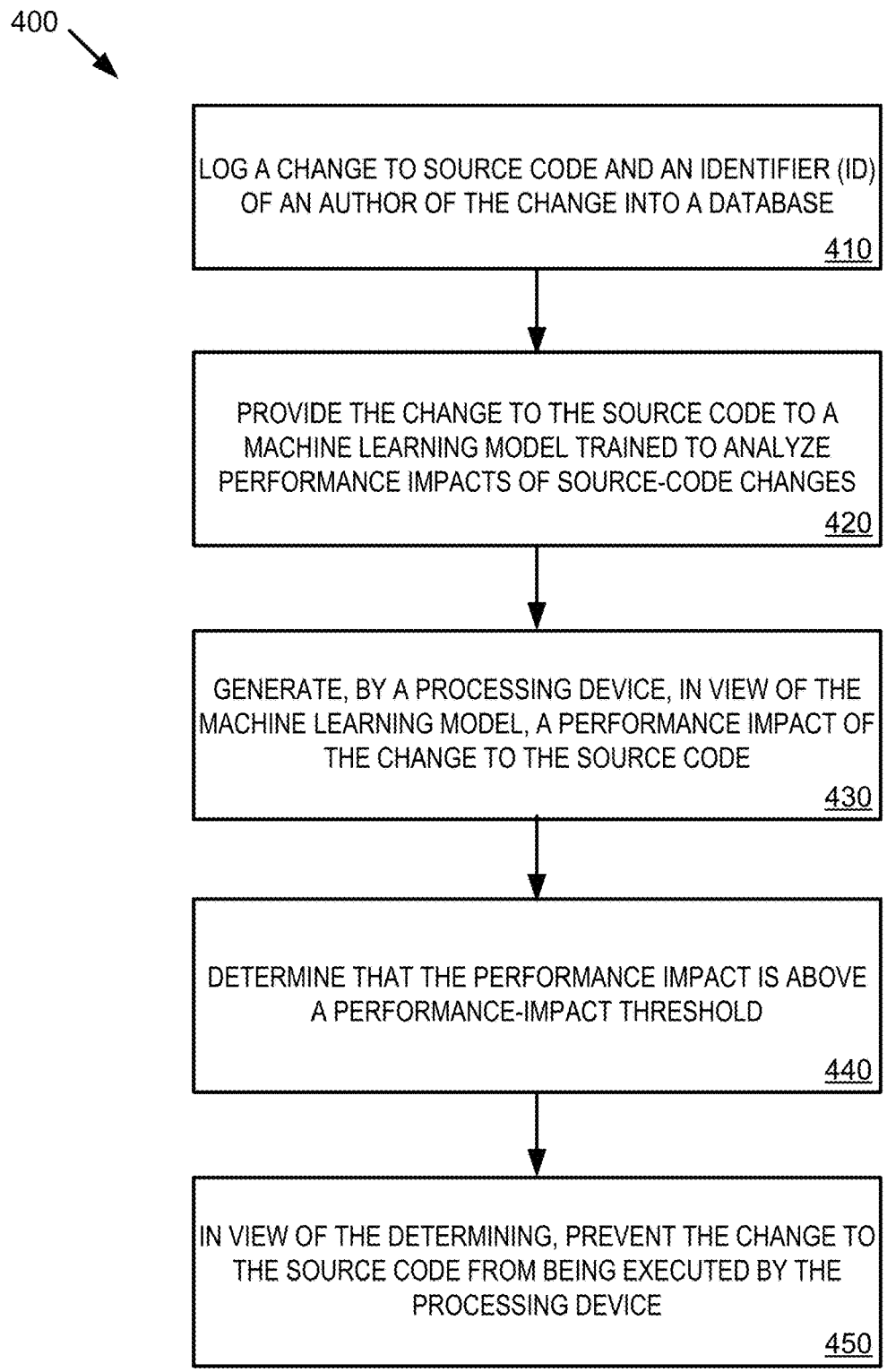
FIG. 4 is a flow diagram of a method of analyzing performance impacts of source code changes, in accordance with some embodiments of the present disclosure.

FIG. 4 is a flow diagram of a method of analyzing performance impacts of source code changes, in accordance with some embodiments of the present disclosure. The method 400 may be performed by processing logic that comprises hardware (e.g., circuitry, dedicated logic, programmable logic, microcode, etc.), software (e.g., instructions run on a processing device to perform hardware simulation), or a combination thereof. In embodiments, aspects of method 400 may be performed by machine learning model 136 of FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Referring to FIG. 4, at block 410, processing logic logs a change to source code and an identifier (ID) of an author of the change into a database. At block 420, processing logic provides the change to the source code to a machine learning model trained to analyze performance impacts of source-code changes. In one embodiment, the machine learning model generates correlations between changes to source code and other metrics (e.g., identified by data points) and finds outliers that identify a higher negative performance impact than expected. Optionally, the correlations may be integrated into a continuous development pipeline, comprising one or more of: continuous development or continuous integration schemes. In some embodiments, the same machine learning models described herein may be used to identify exceptionally well performing source code in addition to identifying underperforming code.

In one embodiment, performance impacts identify how well the source code performs. For example, poorly-written source code that contains an infinite loop may have a severely negative performance impact on an application and/or system running the code. Such negative performance impacts are identified by the current system by comparing performance of source code to baseline performance thresholds. The source code that does not meet the performance standards set by the performance threshold (and its corresponding author) may be flagged, and/or otherwise acted upon as described herein. In the embodiments described herein, source code may be uploaded and/or logged in a repository and data points from the source code are aggregated from the repository with data points from additional sources.

At block 430, processing logic generates, by a processing device, in view of the machine learning model, a performance impact of the change to the source code. In one embodiment, processing logic generates the performance impact in view of multiple sources comprising at least one of: a software running environment, a code repository, a code tracing software for a single request, code tracing software for the infrastructure, or a distributed system configuration. In other embodiments, other suitable sources and data points may be used.

At block 440, processing logic determines that the performance impact is above a performance-impact threshold. In one embodiment, being above the performance-impact threshold indicates that the source code is not sufficiently well written. At block 450, processing logic, in view of the determining at block 440, prevents the change to the source code from being executed by the processing device. In other embodiments, other actions may be taken in addition to, or instead of the quarantining action of block 450. For example, a report may be automatically generated that identifies the culpable source code and its author. In another embodiment, processing logic may also automatically identify other source code uploaded by the same author, so that such additional source code may be reviewed further. In another embodiment, processing logic may automatically prevent the author from executing additional source without additional review.

In one embodiment, the data stream analyzed by the machine learning model represents data points within a defined sliding window of time. Processing logic may optionally adjust the sliding window over which time source code changes and the corresponding metrics are recorded to best suit the analysis to be performed. Optionally, processing logic may perform other related tasks, in support of the embodiments described herein. For example, in one embodiment processing logic may cause the machine learning model to provide a predefined set of maximum runtimes expected (e.g., to establish performance-impact thresholds), and/or classify incoming source code changes and the corresponding metrics to allow for more efficient reporting and action generation.

Figure 5:
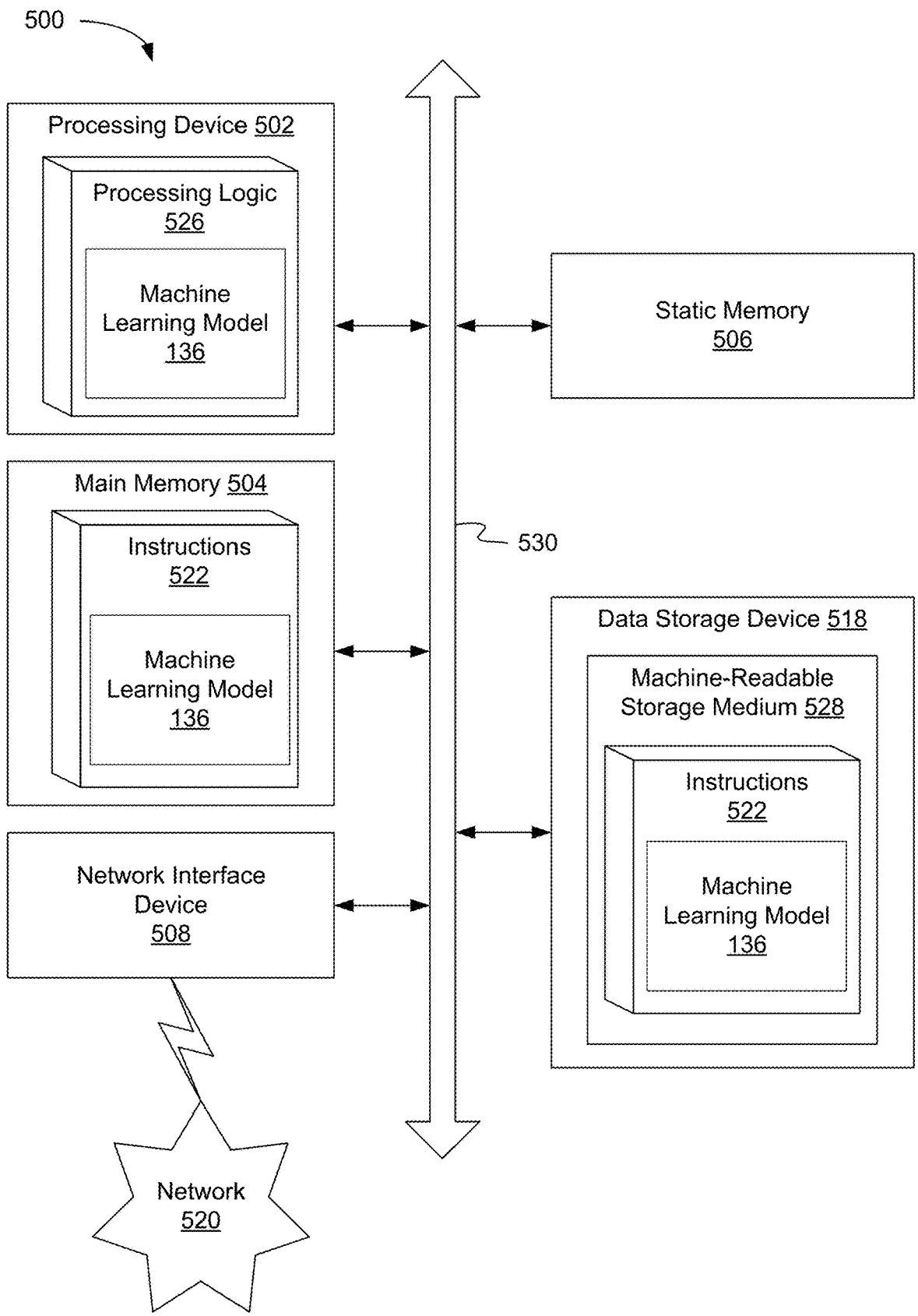
FIG. 5 is a block diagram of an example apparatus that may perform one or more of the operations described herein, in accordance with some embodiments.

FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of a server, such as cloud servers 110a, b configured to perform data storage and migration.

The exemplary computer system 500 includes a processing device 502, a main memory 504 (e.g., read-only memory (ROM), flash memory, dynamic random access memory (DRAM), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic 526, which may be one example of machine learning model 136 of FIG. 1, for performing the operations and steps discussed herein.

The data storage device 518 may include a machine-readable storage medium 528, on which is stored one or more set of instructions 522 (e.g., software) embodying any one or more of the methodologies of functions described herein, including instructions to cause the processing device 502 to execute machine learning model 136. The instructions 522 may also reside, completely or at least partially, within the main memory 504 or within the processing device 502 during execution thereof by the computer system 500; the main memory 504 and the processing device 502 also constituting machine-readable storage media. The instructions 522 may further be transmitted or received over a network 520 via the network interface device 508.

The machine-readable storage medium 528 may also be used to store instructions to perform a method for multi-level task debugging, as described herein. While the machine-readable storage medium 528 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof

What is claimed is:

1. A method, comprising:
    logging, by a processing device, a change to source code and an identifier (ID) of an author of the change to the source code in a database, wherein the database comprises a plurality of source code changes associated with a plurality of author IDs, each author ID of the plurality of author IDs is associated with one or more source code changes of the plurality of source code changes, the ID of the author of the change is associated with additional source code;
    generating, by the processing device, a determined performance impact of the change to the source code by adjusting a sliding window over which time the source code changes and one or more metrics are simultaneously recorded;
    determining, by the processing device, that the determined performance impact exceeds a performance-impact threshold, the processing device establishing the performance-impact threshold based on a predefined set of expected maximum runtimes;
    in response to the determined performance impact exceeding the performance-impact threshold,
    quarantining, by the processing device, the source code to prevent execution of the change to the source code,
    identifying, by the processing device using the database, the additional source code associated with the ID of the author of the change to the source code;
    flagging, by the processing device, the additional source code for review; and
    automatically prevent the author from executing the additional source code prior to the review.

2. The method of claim 1, wherein the change to the source code is logged from a source code repository.

3. The method of claim 1, wherein generating the determined performance impact of the change to the source code is further based, at least in part, on at least one selected from a group consisting of:
    information associated with a software running environment;
    information associated with a code repository;
    information associated with a code tracing software; and
    information associated with a distributed system configuration.

4. The method of claim 1, further comprising:
    generating, by the processing device, correlations between the change to the source code and the one or more metrics, wherein the one or more metrics comprise at least one metric selected from a group consisting of:
    a first metric associated with the management, the operation, or the utilization of the computing technology or the resources associated with building, processing, compiling, or executing the source code; and
    a second metric associated with the computing technology or the resources associated with building, processing, compiling, or executing the source code.

5. The method of claim 4, wherein the correlations are integrated into a continuous development pipeline comprising a continuous development scheme, a continuous integration scheme, or both.

6. The method of claim 4, further comprising:
    generating, by processing device, the predefined set of expected maximum runtimes; and
    classifying, by the processing device, the change to the source code and the one or more metrics.

7. A system, comprising:
    memory to store a change to source code and an identifier (ID) of an author of the change to the source code; and
    a processing device, operatively coupled to the memory, to:
    log the change to the source code and the ID of the author in a database, wherein the database comprises a plurality of source code changes associated with a plurality of author IDs, each author ID of the plurality of author IDs is associated with one or more source code changes of the plurality of source code changes, the ID of the author of the change is associated with additional source code;
    generate a determined performance impact of the change to the source code by adjusting a sliding window over which time the source code changes and one or more metrics are simultaneously recorded;
    determine that the determined performance impact exceeds a performance-impact threshold, the processing device establishing the performance-impact threshold based on a predefined set of expected maximum runtimes;

in response to the determined performance impact exceeding the performance-impact threshold, quarantine the source code to prevent execution of the change to the source code, identify, using the database, the additional source code associated with the ID of the author of the change to the source code;

flag the additional source code for review; and automatically prevent the author from executing the additional source code prior to the review.

8. The system of claim 7, wherein the change to the source code is logged from a source code repository.

9. The system of claim 7, wherein the processing device to generate the determined performance impact of the change to the source code is further based, at least in part, on at least one selected from a group consisting of:

information associated with a software running environment;

information associated with a code repository;

information associated with a code tracing software; and information associated with a distributed system configuration.

10. The system of claim 7, wherein the processing device to generate correlations between the change to the source code and the one or more metrics, and wherein the one or more metrics comprise at least one metric selected from a group consisting of:

a first metric associated with the management, the operation, or the utilization of the computing technology or the resources associated with building, processing, compiling, or executing the source code; and a second metric associated with the computing technology or the resources associated with building, processing, compiling, or executing the source code.

11. The system of claim 10, wherein the correlations are integrated into a continuous development pipeline comprising a continuous development scheme, a continuous integration scheme, or both.

12. The system of claim 10, wherein the processing device is further to:

generate the predefined set of expected maximum runtimes; and classify the change to the source code and the one or more metrics.

13. A non-transitory computer-readable storage medium including instructions that, when executed by a processing device, cause the processing device to:

log a change to source code and an identifier (ID) of an author of the change in a database, wherein the database comprises a plurality of source code changes associated with a plurality of author IDs, each author ID of the plurality of author IDs is associated with one or more source code changes of the plurality of source code changes, the ID of the author of the change is associated with additional source code;

generate a determined performance impact of the change to the source code adjusting a sliding window over which time the source code changes and one or more metrics are simultaneously recorded;

determine that the determined performance impact exceeds a performance-impact threshold, the processing device establishing the performance-impact threshold based on a predefined set of expected maximum runtimes;

in response to the determined performance impact exceeding the performance-impact threshold, quarantine the source code to prevent execution of the change to the source code, identify, using the database, the additional source code associated with the ID of the author of the change to the source code;

flag the additional source code for review; and automatically prevent the author from executing the additional source code prior to the review.

14. The non-transitory computer-readable storage medium of claim 13, wherein the instructions that, when executed by the processing device, cause the processing device to generate the determined performance impact of the change to the source code are further based, at least in part, on at least one selected from a group consisting of:

information associated with a software running environment;

information associated with a code repository;

information associated with a code tracing software; and information associated with a distributed system configuration.

15. The non-transitory computer-readable storage medium of claim 13, wherein the instructions that, when executed by the processing device, cause the processing device to generate correlations between the change to the source code and the one or more metrics, and wherein the one or more metrics comprise at least one metric selected from a group consisting of:

a first metric associated with the management, the operation, or the utilization of the computing technology or the resources associated with building, processing, compiling, or executing the source code; and a second metric associated with the computing technology or the resources associated with building, processing, compiling, or executing the source code.

16. The non-transitory computer-readable storage medium of claim 15, wherein the correlations are integrated into a continuous development pipeline comprising a continuous development scheme, a continuous integration scheme, or both.

17. The non-transitory computer-readable storage medium of claim 15, wherein the instructions further comprise instructions that, when executed by the processing device of a storage system, cause the processing device to:

generate the predefined set of expected maximum runtimes; and classify the change to the source code and the one or more metrics.

* * * * *